ELECTRICAL CIRCUITS

Filed Feb. 15, 1961 2 Sheets-Sheet 1

INVENTORS
WALTER F. KOSONOCKY &
BY JUAN J. AMODEI
John V. Regan
ATTORNEY

Nov. 10, 1964 W. F. KOSONOCKY ETAL 3,156,816

ELECTRICAL CIRCUITS

Filed Feb. 15, 1961 2 Sheets-Sheet 2

INVENTORS
WALTER F. KOSONOCKY &
BY JUAN J. AMODEI

John V. Regan
ATTORNEY

United States Patent Office 3,156,816

Patented Nov. 10, 1964

3,156,816

ELECTRICAL CIRCUITS

Walter F. Kosonocky, Iselin, N.J., and Juan J. Amodei, Levittown, Pa., assignors to Radio Corporation of America, a corporation of Delaware Filed Feb. 15, 1961, Ser. No. 89,537
23 Claims. (Cl. 235—172)

This invention relates to electrical circuits suitable for use in an information handling system for performing binary full addition and analog-to-binary conversion.

Full adder circuits are used in digital computers, for example, for adding two binary numbers. It is known in the art to construct a full adder circuit by combining two half adders. Such a circuit, however, generally requires twice the number of components as a half adder. Moreover, the logical operation of full addition generally must be performed in two separate steps timewise.

It is an object of this invention to provide a new and improved binary full adder circuit.

It is another object of this invention to provide an improved full adder circuit which has a reduced number of components.

It s still another object of this invention to provide an improved full adder circuit which performs binary full addition in a single logic operation per stage.

It is a further object of this invention to provide an electrical circuit which can add, in a single operation, the digits of like significance of more than two binary numbers.

It is yet another object of this invention to provide an improved electrical circuit which can add two multidigit binary numbers in parallel.

A still further object of the invention is to provide a circuit of the type described which, with slight modification, can convert an analog voltage to an equivalent binary representation.

Circuitry according to the present invention makes use of the saturation properties of a transistor and the current-versus-voltage relationship of a negative resistance diode, which preferably is a tunnel diode. In one embodiment of the invention, a tunnel diode is connected in parallel with the internal emitter-base path of a first transistor and in series with the internal emitter-collector path of a second transistor. The transistors are arranged in the common base configuration. Input pulses are applied at a point common to the tunnel diode and the emitter of the first transistor.

In a system wherein a binary "one" is represented by a current pulse having an amplitude I, the tunnel diode is selected to have a current peak $I_p$, where $I<I_p<2I$. The parameters of the first transistor circuitry are chosen so that the first transistor saturates when the collector current thereof is approximately 2I.

In the accompanying drawing, like reference characters refer to like components, and:

Figure 1:
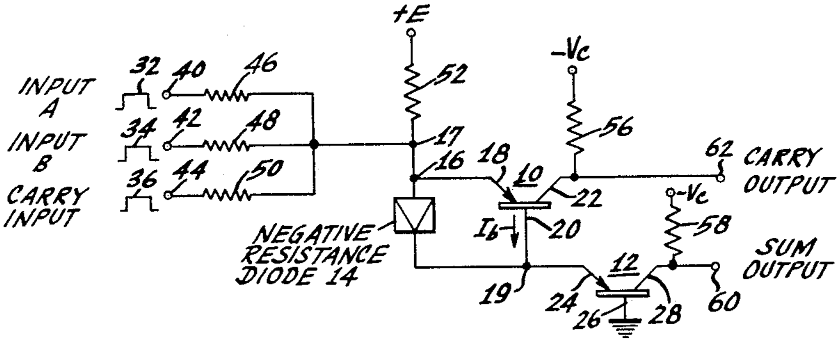
FIGURE 1 is a schematic diagram of a binary full adder stage.
Figures 2, 5:
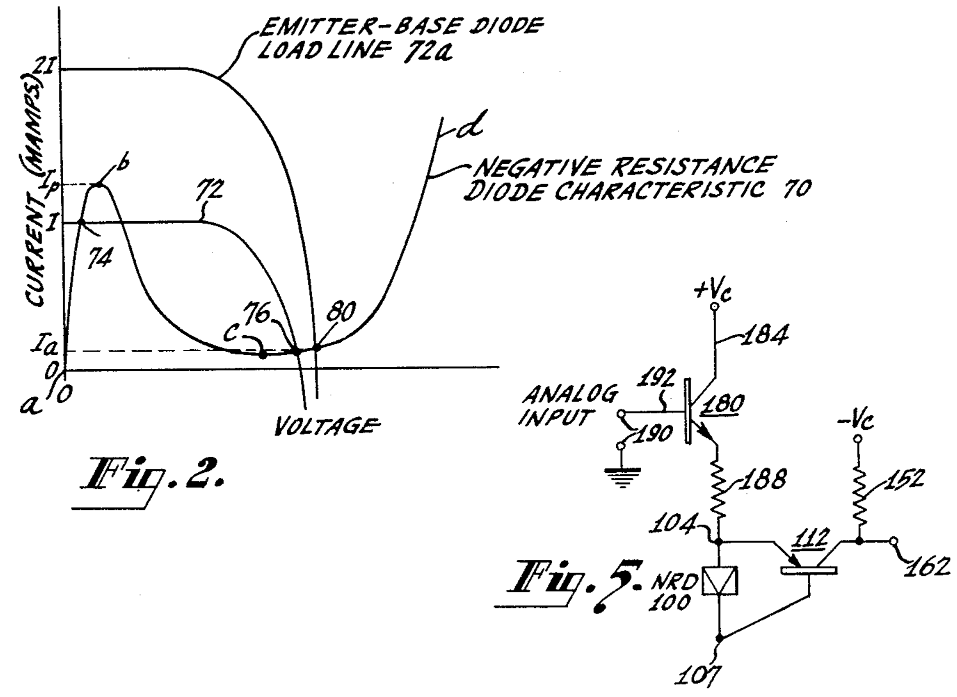
FIGURE 2 is a set of current-versus-voltage characteristics useful in explaining the operation of the FIGURE 1 adder.
Figure 4:
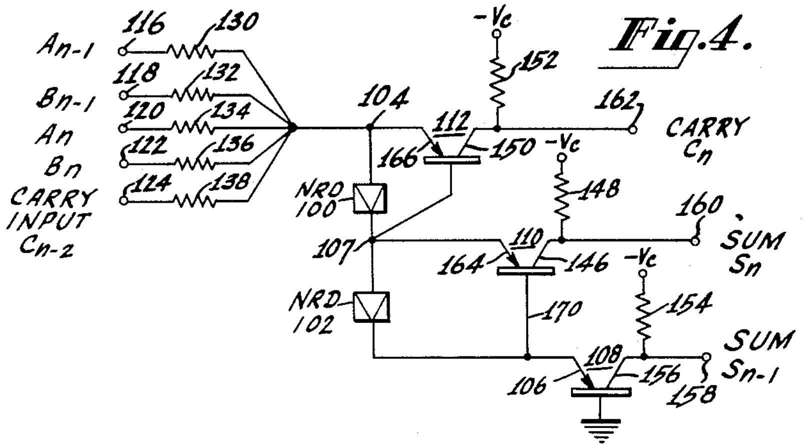

FIGURES 3*a* and 3*b* are schematic diagrams of two different input circuits which may be used in the FIGURE 1 circuit;

FIGURE 4 is a schematic diagram of a binary full adder circuit for performing parallel addition of two multidigit numbers; and FIGURE 5 is a partial schematic diagram of an analog-to-binary converter.

FIGURE 1 is a binary full adder stage for adding the digits of like significance of two binary numbers and a carry digit generated by the addition of the two binary digits of next-lower significance. The stage comprises first and second transistors 10, 12 each connected in the common-base configuration. A negative resistance diode 14, which is preferably a tunnel diode, is connected in parallel with the emitter-base path of the first transistor 10 and in series with the emitter-collector path of the second transistor 12. When the transistors 10, 12 are PNP transistors, as illustrated, the anode of the tunnel diode 14 is connected to a first junction point 16, which is common to the emitter electrode 18 of the first transistor 10. The cathode of the tunnel diode 14 is connected to the base electrode 20 of the first transistor 10 and to the emitter electrode 24 of the second transistor 12 at a second junction point 19. The base electrode 26 of the latter transistor 12 is connected to a point of reference potential, illustrated schematically as circuit ground.

Input signals 32, 34 and 36 representing, respectively, binary digits of like significance of two binary numbers A and B and a carry input are applied between terminals 40, 42 and 44, respectively, and ground. The input terminals 40, 42, 44 are connected by way of resistors 46, 48, 50, respectively, to the first junction point 16. In certain cases, it may be desirable, or necessary, to connect the junction point 16 to a source of bias +E by way of a resistor 52, for reasons which will be described more fully hereinafter. The collector electrodes 22, 28 of the transistors 10, 12 are connected to a common biasing source $-V_c$ by separate load resistors 56, 58, respectively.

The truth table for a full adder circuit, in which A and B are binary digits of like significance of two binary numbers to be added, is as follows, where the carry input digit is generated in a stage which adds the binary digits of next-lower significance:

*Table I*

| Inputs | | | Outputs | |
|---|---|---|---|---|
| A | B | Carry | Sum | Carry |
| 0 | 0 | 0 | 0 | 0 |
| 1 | 0 | 0 | 1 | 0 |
| 0 | 1 | 0 | 1 | 0 |
| 0 | 0 | 1 | 1 | 0 |
| 1 | 1 | 0 | 0 | 1 |
| 1 | 0 | 1 | 0 | 1 |
| 0 | 1 | 1 | 0 | 1 |
| 1 | 1 | 1 | 1 | 1 |

In an information handling system, a binary "one" may be represented by a positive-going pulse and a binary "zero" may be represented by the absence of a pulse. The resistors 46, 48, 50 in the input network are selected in value so that an input pulse applied at any of the input terminals 40, 42, 46 causes a current of I milliamps, in the conventional sense, to flow into the junction 16. That is to say, a single input pulse causes a current I to flow into the junction 16; two input pulses cause a current 2I to flow into the junction 16; and three input pulses cause a current 3I to flow into the junction 16. It is desirable that no current flow into the junction 16 when no input pulses are applied. If the voltage levels at the input terminals 40, 42, 44 are not "zero" in the absence of input pulses, then resistor 52 and biasing source +E may be added to the circuit to affect any input bias to assure that the voltage at the junction point 16 is "zero" in the absence of input pulses. This assures that no current flows into the tunnel diode 14 or the emitter 18 in the absence of an input pulse.

The SUM output of the adder circuit is derived at an output terminal 60 connected by way of the collector emitter path of the second transistor 12 to the junction point 19. The CARRY output is derived at an output terminal 62, which is connected to the collector electrode 22 of the first transistor 10.

In order to provide output signals corresponding to the above truth table, the second transistor 12 must conduct current when the number of inputs to the circuit is odd. The first transistor 10 must conduct current when two or more inputs are applied concurrently. This is accomplished in the FIGURE 1 circuit by selecting a tunnel diode 14 which has a current peak $I_p$ which is greater than I milliamps and less than 2I milliamps. The parameters of the first transistor 10, and especially the value of resistor 56, are selected so that the first transistor 10 saturates when the collector current in the transistor 10 has a value of approximately 2I milliamps. The operation of the circuit may best be described in connection with the volt-ampere characteristics of FIGURE 2.

The volt-ampere characteristic of the tunnel diode 14 is illustrated in FIGURE 2 by the curve 70. In FIGURE 2, voltage is plotted along the abscissa and current is plotted along the ordinate. Diode characteristic 70 has a first positive resistance region *ab* in the low voltage region and a second positive resistance region *cd* in the high voltage region, relatively speaking. The two positive resistance regions are separated by a region *bc* of negative resistance. The first transistor 10 may be considered as a load connected in parallel with the tunnel diode 14, and a load line 72 representing the transistor characteristic may be drawn in FIGURE 2 to determine the operating point of the tunnel diode 14 in response to one or two input pulses. The response of the circuit to three input pulses is somewhat more complicated, and no attempt is made to illustrate this response in FIGURE 2.

No current flows into the junction 16 in the absence of an input pulse. The current through the tunnel diode 14 and the current into the emitter electrode 18 of the transistor 10 are both zero at this time. Consequently, no outputs appear at either of the output terminals 60, 62. The curve 72 in FIGURE 2 represents the transistor characteristic looking between the emitter and base electrodes 18 and 20 when a current I flows into the junction 16. This curve 72 intersects the ordinate at a current value I. The curve 72 intersects the positive resistance region *ab* at a point 74 and intersects the positive resistance region *cd* at a point 76. The point 74 represents the operating point for the circuit at this time since the peak current $I_p$ of the tunnel diode 14 has not been exceeded. As may be seen from FIGURE 2, all of the current I flows into the tunnel diode 14. This current flows into the emitter electrode 24, causing a large output at the SUM output terminal 60. No output is present at the CARRY output terminal 62 because the current into the emitter electrode 18 is zero. An output, as the term is used here, means a positive-going pulse at an output terminal 60 or 62.

Consider now the operation of the circuit when two input pulses are applied. A current 2I flows into the junction 16. The transistor 10 characteristic 72 is elevated in FIGURE 2 to intersect the ordinate at a point 2I, to reflect the increase in input current. This elevated curve, which is designated 72*a* in FIGURE 2, intersects the diode characteristic 70 only at a point 80 in the region *cd*. A small current $I_a$ then flows into the tunnel diode 14 from junction 16. The remainder $2I-I_a$ of the input current, flows into the emitter electrode 18 of the first transistor 10 and, almost in its entirely, to the collector 22, causing a large output to appear at the CARRY output terminal 62. Actually, the current flowing into the collector 22 has a value $\alpha(2I-I_a)$, where $\alpha$ is the "alpha" of the first transistor 10. The remainder of the emitter 18 current flows into the base 20 to provide a base current $$I_b=(1-\alpha)(2I-I_a)$$

The currents $I_a$ and $I_b$ which, together, are less than 0.2I, flow into the emitter 24 of the second transistor 12 and cause a very small output, relatively speaking, to appear at the SUM output terminal 60. This small output can be neglected in most cases since the SUM output usually is supplied to a register having a threshold greater than the aforementioned small signal. However, the current $I_a+I_b$ may be prevented from flowing into the emitter 24, if desired, by supplying a suitable current path (not shown) to shunt current of this magnitude away from the emitter 24.

The value of the collector load resistor 56 is chosen so that the first transistor 10 saturates when the collector 22 current has a value $(2I-2I_a-I_b)$ milliamps. For practical purposes, this current is approximately equal to 2I, and will be so referred to hereinafter for convenience. Because the transistor 10 saturates when the collector current thereof is 2I, any input current in excess of this value must be taken up by the tunnel diode 14 and the emitter-base path of the transistor 10 and, in either case, eventually flows into the emitter electrode 24 of the second transistor 12. This phenomenon of excess current distribution is important to the operation of the circuit when three inputs are applied.

Consider now the operation of the circuit in response to three applied input pulses 32, 34 and 36. A current of 3I milliamps flows into the junction 16 and switches the tunnel diode 14 to the high voltage state. The first transistor 10 then conducts, as in the case of two applied inputs, and saturates when the collector 22 current reaches a value of approximately 2I milliamperes. The remaining unit I of input current flows into the emitter electrode 24 of the second transistor 12 by way of the tunnel diode 14 and the emitter-base path of the first transistor 10. Output pulses then are present at both of the output terminals 60, 62.

In summary, an output pulse is provided at the SUM output terminal whenever either one or three input pulses are applied to the circuit. An output pulse is provided at the CARRY output terminal whenever either two or three input pulses are applied. Referring to Table I above, it may be seen that the output conditions described are those required of a binary full adder circuit.

Full adder stages of the type illustrated in FIGURE 1 have performed addition of binary digits in less than three nanoseconds (millimicroseconds) per stage, where three nanoseconds is the time required for the outputs to reach full amplitude. However, the output pulses have very fast rise times because of the high speed switching capabilities of tunnel diodes, and it has been found that a sufficient carry output to operate another stage is generated in less than three nanoseconds. Saturation of the first transistor 10 does not place a severe limitation on the recovery time of the adder because the transistor 10 is connected in the common base configuration.

The FIGURE 1 circuit has the further advantageous feature that no reset circuit is required to reset the tunnel diode 14 from the high voltage state to the low voltage state. Since no current is supplied to the junction 16 in the absence of an input pulse, the current into the tunnel diode 14 drops to zero at the termination of the input pulses, and the tunnel diode 14 then switches automatically to the quiescent operating point *a*.

It will be apparent to those skilled in the art that NPN transistors may be used in the FIGURE 1 circuit, provided that the polarities of the various biasing sources and input pulses are reversed. The tunnel diode 14 connections also must be reversed. It also should be pointed out that the second transistor 12 may be replaced by a different type of impedance element in most cases. Since the SUM output usually is supplied to a register, or like device, it generally is necessary only to provide an output pulse that exceeds a certain threshold. The transistor 12, however, has the advantage that it provides a compatible output level.

Figure 3:
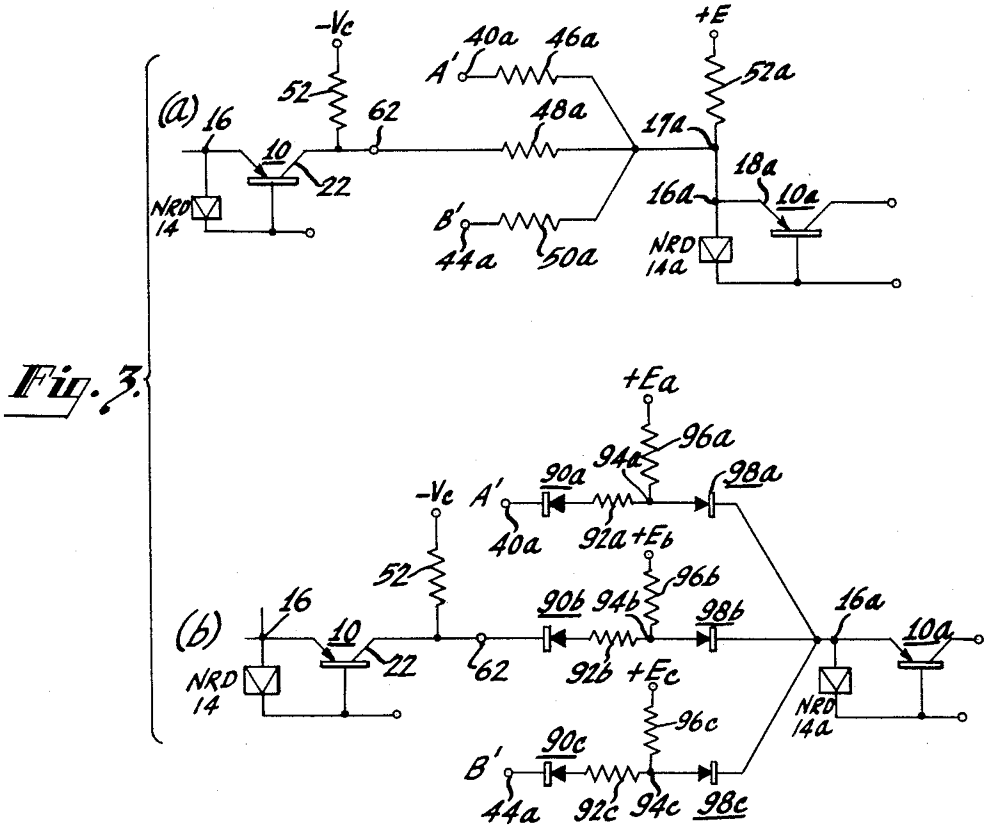

It may be noted that the change in the collector 22 current, between CARRY output and NO CARRY output conditions, is approximately twice as great as the current which it is desired to apply at the carry input terminal of the succeeding adder stage (not shown). FIGURE 3 illustrates two different circuit arrangements for adjusting the carry output signal to the desired level. Consider first the circuit of FIGURE 3*a*. The first transistor 10 of FIGURE 1 is shown at the left in FIGURE 3*a*; the first transistor 10*a* of the next succeeding stage is shown at the right. A resistor 48*a* is connected between the CARRY output terminal 62 and the common input junction point 17*a* of the next full adder stage. Inputs A′ and B′ are applied at input terminals 40*a*, 44*a*. The inputs A′ and B′ represent the binary digits of the next-higher order of the two binary numbers to be added.

The collector load resistor 52 and bias source $-V_c$, as described previously, are selected so that the transistor 10 saturates when the collector 22 current has a value of 2I milliamps. It is desired, however, that the transistor 10 stage cause no current to flow into the junction 16*a* of the next stage when the transistor 10 is not conducting, and that the transistor 10 stage cause a current I to flow into the junction 16*a* when the transistor 10 is in saturation. Two different circuit arrangements are illustrated in FIGURE 3 for accomplishing this purpose. Consider the circuit of FIGURE 3*a*, and assume first that the A′ and B′ inputs are zero volts when binary "zero" signals are applied at the input terminals 40*a*, 44*a*, respectively. Assume further that each of the inputs A′ and B′ is a positive signal having an amplitude sufficient to supply a current I to the circuit when a binary "one" is applied at either of the input terminals 40*a*, 44*a*, respectively.

The values of the biasing source +E and resistor 52*a* then are selected so that the combination acts as a current source providing a current I to the junction 17*a*. These values also are selected so that the voltage at the junction 17*a* is zero when no binary "one" inputs are applied to the circuit. The current I from the source +E then flows in the path comprising the resistors 48*a* and 52. When the transistor 10 is driven into saturation, the voltage at the collector electrode 22 thereof rises to approximately ground potential, and the current I supplied by the source +E then is diverted to the junction 16*a*.

If the voltages at the input terminals 40*a* and 44*a* are negative in response to a binary "zero" input and rise to ground potential in response to a binary "one" input, selection of the circuit parameters is as follows. The values of the biasing source +E and the resistor 52*a* are selected so that this combination acts as a current source of 3I milliamps, and so that the voltage at the junction point 17*a* is zero volts when no binary "one" inputs are applied (the voltage across the resistor 52*a* is E volts). The resistors 46*a*, 48*a*, 50*a* are selected so that I milliamps flows to each of the input terminals 40*a*, 62, 44*a* from the junction 17*a*. When a binary "one" signal is applied at any of the input terminals 40*a*, 62, 44*a*, the current I which normally is supplied to that input terminal from the junction 17*a* then is diverted to the junction 16*a*. With two binary "one" inputs, for example, current of 2I flows into the junction 16*a* from the source +E.

Consider now the circuit of FIGURE 3*b*. Each of the input circuits is separately biased by an individual biasing source $E_a$, $E_b$ or $E_c$. The CARRY input circuit is representative of the other input circuits, and a description thereof will suffice for the others. The series combination of a diode 90*b* and a resistor 92*b* is connected between the input terminal 62 and a junction point 94*b*. A diode 98*b* is connected between the junction point 94*b* and the common junction 16*a* at the anode of the tunnel diode 14*a*. A constant current source comprising a biasing source of $+E_b$ volts and a resistor 96*b* is also connected at the junction point 94*b*. The current source supplies a current of I milliamps to the junction point 94*b*. The value of the resistor 96*b* is chosen so that the voltage at the junction point 94*b* is zero volts. The voltages at the junction points 94*a* and 94*c* in the other input circuits also are zero. When the transistor 10 is nonconducting, the diode 90*b* is forward biased, and the constant current I flows through the diode 90*b* and the resistor 52 to the biasing source $-V_c$. None of the current flows through the diode 98*b* to the junction 16*a*. When the transistor 10 is driven into saturation, the collector 22 voltage rises to approximately ground potential. The constant current I then flows to the junction 16*a* by way of the path of low impedance, relatively speaking, provided by the diode 98*b*.

The constant current sources in the other input circuits do not necessarily supply current of I milliamps at the junction points 94*a* and 94*c*. The values of the currents supplied by these constant current sources is determined by the levels of the input signals A′ and B′. It is only necessary that the components in these input circuits be selected so that the voltages are zero at the junction points 94*a* and 94*c* and so that each of the current sources supplies a current I to the common junction 16*a* when a binary "one" signal is present at the respective input terminal 40*a* or 44*a*.

A full adder for performing parallel addition of two multidigit binary numbers is illustrated schematically in FIGURE 4. Structurally, this circuit may be recognized as an extension of the FIGURE 1 circuit. The circuit comprises a pair of tunnel diodes 100, 102 connected in series between a first junction point 104 and the emitter electrode 106 of a transistor 108. A transistor 110 has its emitter-base path connected in parallel with the tunnel diode 102. Another transistor 112 has its emitter-base path connected in parallel with the tunnel diode 100. All of the transistors 108, 110 and 112 are connected in the common-base configuration.

Signals representing the $A_{n-1}$ digit and the $A_n$ digit of a first binary number are applied at input terminal 116, 120, respectively. Signals representing the $B_{n-1}$ and the $B_n$ digits of a second binary number are applied at input terminals 118, 122, respectively. A fifth input to the circuit may be a carry input, designated $C_{n-2}$, applied at an input terminal 124. The input terminals 116, 118 and 124 are connected through separate resistors 130, 132 and 138, respectively, to the junction point 104. Each of these resistors 130, 132, 138 has a value of R ohms. The input terminals 120 and 122 are connected through separate resistors 134 and 136, respectively, to the junction point 104. Each of the latter resistors has a value *R*/2 ohms. That is to say, the input resistors are weighted inversely according to the relative binary significance of the inputs, assuming all of the input signals have the same positive voltage swing.

A binary "one" input is represented in the present system by a positive pulse; a binary "zero" input is represented by the absence of a pulse. A binary "one" input applied at any of the input terminals 116, 118 or 124 causes a current I to flow into the junction 104. A binary "one" input applied at either of the other input terminals 120 or 122, however, causes a current 2I to flow into the junction point 104, because of the weighted resistor input network. Of course, no current flows into the junction 104 in response to a binary "zero" input. The following Table II is a "truth" table for the adder circuit of FIGURE 4:

*Table II*

| Inputs | | | | | Outputs | | |
|---|---|---|---|---|---|---|---|
| $A_n$ | $B_n$ | $A_{n-1}$ | $B_{n-1}$ | $C_{n-2}$ | $C_n$ | $S_n$ | $S_{n-1}$ |
| 0 | 0 | 0 | 0 | 0 | 0 | 0 | 0 |
| 0 | 0 | 0 | 0 | 1 | 0 | 0 | 1 |
| 0 | 0 | 0 | 1 | 0 | 0 | 0 | 1 |
| 0 | 0 | 1 | 0 | 0 | 0 | 0 | 1 |
| 0 | 1 | 0 | 0 | 0 | 0 | 1 | 0 |
| 1 | 0 | 0 | 0 | 0 | 0 | 1 | 0 |
| 0 | 0 | 0 | 1 | 1 | 0 | 1 | 0 |
| 0 | 0 | 1 | 0 | 1 | 0 | 1 | 0 |
| 0 | 0 | 1 | 1 | 0 | 0 | 1 | 0 |
| 0 | 0 | 1 | 1 | 1 | 0 | 1 | 1 |
| 0 | 1 | 0 | 0 | 1 | 0 | 1 | 1 |
| 0 | 1 | 0 | 1 | 0 | 0 | 1 | 1 |
| 0 | 1 | 1 | 0 | 0 | 0 | 1 | 1 |
| 1 | 0 | 0 | 0 | 1 | 0 | 1 | 1 |
| 1 | 0 | 0 | 1 | 0 | 0 | 1 | 1 |
| 1 | 0 | 1 | 0 | 0 | 0 | 1 | 1 |
| 1 | 1 | 0 | 0 | 0 | 1 | 0 | 0 |
| 1 | 0 | 0 | 1 | 1 | 1 | 0 | 0 |
| 1 | 0 | 1 | 0 | 1 | 1 | 0 | 0 |
| 1 | 0 | 1 | 1 | 0 | 1 | 0 | 0 |
| 0 | 1 | 0 | 1 | 1 | 1 | 0 | 0 |
| 0 | 1 | 1 | 0 | 1 | 1 | 0 | 0 |
| 0 | 1 | 1 | 1 | 0 | 1 | 0 | 0 |
| 1 | 0 | 1 | 1 | 1 | 1 | 0 | 1 |
| 0 | 1 | 1 | 1 | 1 | 1 | 0 | 1 |
| 1 | 1 | 0 | 0 | 1 | 1 | 0 | 1 |
| 1 | 1 | 0 | 1 | 0 | 1 | 0 | 1 |
| 1 | 1 | 1 | 0 | 1 | 1 | 0 | 1 |
| 1 | 1 | 0 | 1 | 1 | 1 | 1 | 0 |
| 1 | 1 | 1 | 0 | 1 | 1 | 1 | 0 |
| 1 | 1 | 1 | 1 | 0 | 1 | 1 | 0 |
| 1 | 1 | 1 | 1 | 1 | 1 | 1 | 1 |

The negative resistance diode 102, which is preferably a tunnel diode, is selected to have a current peak $I_p$ which is greater than I and less than 2I. The transistor 110 has its collector electrode 146 connected to a source of bias, $-V_c$, through a resistor 148. The value of the resistor 148 is selected so that the transistor 110 saturates when the collector current is approximately 2I. The negative resistance diode 100 is selected to have a current peak which is greater than 3I and less than 4I. The transistor 112, connected in parallel with the diode 100, has its collector electrode 150 connected to the biasing source $-V_c$ by a resistor 152. The value of the resistor 152 is selected so that the transistor 112 saturates when the collector current thereof has a value of approximately 4I.

The CARRY input circuit is included in the adder of FIGURE 4 to indicate that the addition of two multidigit numbers may be performed by first dividing each of the two numbers into groups of several digits each, and then performing parallel addition of the digits in the groups of like order significance. Any carry resulting from the addition of two like order groups of digits then is supplied as an input to the adder stage which adds the digits in the two groups of next-higher order significance. For example, given two N digit numbers A and B to be added, the digits of each number may be divided into two groups. The first group of each number may comprize the first *i*th digits of that number. The second group of each number then comprises the *k*th through the *n*th digits of that number. The first group of digits of A is added in parallel to the first group of digits of B. The second group of digits of A then is added in parallel to the second group of digits of B and to any carry resulting from the addition of the first groups.

The CARRY input $C_{n-2}$ in FIGURE 4 is the carry resulting from the addition of the two groups of lower order significance of the numbers A and B. The FIGURE 4 adder, as illustrated, is capable of adding two groups of like order significance of two digits each and a previously generated carry digit. However, it will be apparent from the description of the operation of the FIGURE 4 circuit that the adder may be extended to perform addition in parallel of groups of more than two digits.

Consider now the operation of the FIGURE 4 circuit. One unit I of current is supplied to the junction point

104 whenever a single input pulse is applied to the circuit at one of the input terminals 116, 118 or 124. This input current is less than the peak currents of either of the tunnel diodes 100, 102. Consequently, this input current flows through the tunnel diodes 100, 102 and into the emitter electrode 106 of the transistor 108, resulting in a large output at the output electrode 158. No output appears at either of the other output terminals 160, 162. Two units of input current, that is 2I milliamps, are supplied at the junction point 104 when binary "one" signals are present only at any two of the input terminals 116, 118 and 124, or one only of the input terminals 120, 122. This current is less than the peak current of the tunnel diode 100 and, for this reason, all of the input current flows into the junction 107. However, 2I current is greater than the peak current of the tunnel diode 102, whereby the tunnel diode 102 is switched into the high voltage, low current state (point 80, FIGURE 2). Only valley current $I_a$ then flows through the tunnel diode 102. The current $I_a$ and a small base current $I_{b1}$ flow into the emitter electrode 106, and a negligible output appears at output terminal 58. Most of the current (2I for practical purposes) flows to the collector 146 of the transistor 110 and causes the transistor 110 to saturate. A large output is then present at the output terminal 160.

When three units of input current are applied at the junction point 104, the current flows through the tunnel diode 100 to the junction 107. This value of current is sufficient to switch the tunnel diode 102 to the high voltage state, whereby the transistor 110 is biased into conduction. The transistor 110, however, saturates when the collector current reaches a value of approximately 2I. The additional unit of current must flow partially through the tunnel diode 102 and partially through the emitter-base diode of the transistor 110 to the emitter electrode 106 of the transistor 108. Output signals then are present at the output terminals 158 and 160. With four units of input current supplied at the junction point 104, the tunnel diode 100 switches to the high voltage, low current state. Only a negligible amount of the input current flows into the tunnel diode 100 when this diode 100 is in the high voltage state. Almost all of the input current 4I flows into the emitter electrode 166 of the transistor 112 and causes sufficient collector current to flow to saturate the transistor 112. A large output signal is present only at the output terminal 162 at this time.

The tunnel diode 100 also switches to the high voltage state when five units of current are supplied at the junction point 104. Approximately four units of this current flow from the emitter electrode 166 to the collector electrode 150, saturating the transistor 112 and providing a large output at the output terminal 162. The remaining unit of input current then must flow partially through tunnel diode 100 and partially through the emitter-base diode of the transistor 112 to the junction point 107. This unit of current then flows through the tunnel diode 102 and into the emitter electrode 106 of the transistor 108. A large output signal then is present at the output terminal 158.

With six units of input current, transistors 112 and 110 both are in saturation and only a negligible current flows into the emitter electrode 106 of the transistor 108. With seven units of input current supplied at the junction point 104, transistors 110 and 112 again are in saturation, and the tunnel diodes 100 and 102 are both in the high voltage, low current state. The additional unit of input current flows into the emitter electrode 106 from the tunnel diode 102 and the base electrode 170 of the transistor 110. Outputs then are present at all of the output terminals 158, 160, 162. It is thus seen that the output signals derived at the output terminals 158, 160 and 162 for any input condition are in accordance with the second "truth" Table II above.

The FIGURE 4 circuit may be extended by adding additional tunnel diodes and additional transistors so that two binary quantities of more than two digits each may be added in parallel. The tolerances of the various elements, however, become more critical as additional stages are added. If the multidigit numbrs to be added are large, that is to say, contain many digit positions, it may be desirable and even necessary to break the multidigit numbers into smaller groupings as described previously. It should be noted that the FIGURE 4 circuit has the advantage that it is unnecessary to generate individual carries for each digit position. The FIGURE 4 circuit has the further advantage that it allows two multidigit numbers to be added in parallel, rather than in series, and thereby reduces the time for performing addition. It also should be noted that the FIGURE 4 circuit is capable of performing addition of like order digits of more than two binary numbers. For example, seven digits of like order may be added in parallel in the FIGURE 4 circuit if the input circuit is replaced by one having seven input terminals connected to the junction point 104 by seven resistors, respectively, each of R ohms.

A circuit of the type illustrated in FIGURE 4 also may be used to convert analog voltages to the equivalent binary representation by a slight modification of the input circuitry. FIGURE 5 illustrates schematically a portion of an analog-to-binary converter according to the invention. The modification of the FIGURE 4 circuit consists of eliminating the weighted resistor input network connected to the junction point 104 and connecting, in its place, suitable circuitry for supplying an analog current to the junction point 104. A suitable input circuit, illustrated in FIGURE 5, comprises a resistor 188 connected in series with the emitter-collector path of a transistor 180 between the junction point 104 and a biasing source, designated $+V_c$. An analog voltage input signal to be converted is applied at a pair of input terminals 190. One of the input terminals 190 is connected to ground; the other input terminal is connected to the base electrode 192 of the transistor 180. The transistor 180 is an NPN transistor connected as an emitter follower. Accordingly the current flowing in the emitter circuit is proportional to the analog input. The remaining portion of the converter circuit (not shown), which is connected at the junction point 107, is the same as that in FIGURE 4 and described previously.

Operation of the FIGURE 5 circuit, and selection of the various tunnel diode and transistor parameters is identical to that described above in connection with the FIGURE 4 circuit. The outputs at the terminals 158, 160 and 162 then may represent the binary digits $2^0$, $2^1$ and $2^2$, respectively. The converter circuit may have added thereto additional tunnel diodes and transistors to permit conversion of larger analog signals, if desired.

What is claimed is:

1. The combination comprising: a negative resistance diode having a current peak $I_p$, where $I<I_p<2I$; a transistor having an emitter-base path connected in parallel with said diode, said transistor also having a collector electrode; means biasing said collector electrode so that said transistor saturates when the collectod current has a value of approximately 2I; an impedance device having one terminal common to said base and to one terminal of said diode; and means for applying input current at the junction of said emitter and the other terminal of said diode.

2. The combination as claimed in claim 1 wherein said input current applying means supplies current in integral units of I.

3. The combination as claimed in claim 1 wherein said negative resistance diode is a tunnel diode.

4. The combination comprising a negative resistance device having an N-shaped volt-ampere characteristic with a current peak $I_p$ in the low voltage region, where $I<I_p<2I$; a first transistor having a collector-to-emitter path connected in series with said device; a second transistor having an emitter-to-base path connected in parallel with said device and having a collector electrode; circuit means biasing the collector electrode of said second transistor so that said second transistor saturates when the collector current has a value of approximately 2I; and means electrically connected to the junction of said device and the emitter of said first transistor for supplying input current to said device in the forward direction.

5. The combination claimed in claim 4 wherein said negative resistance device is a tunnel diode.

6. The combination comprising: a negative resistance device having a current peak $I_p$ where $I<I_p<2I$; first transistor connected in the common base configuration and having an emitter electrode connected to one terminal of said diode; a second transistor having a base electrode connected to said one terminal, an emitter electrode connected to the other terminal of said diode, and a collector electrode; means biasing said collector electrode so that said second transistor saturates when the collector current thereof has a value of approximately 2I; and means applying input current to said other terminal in integral units of I.

7. The combination claimed in claim 6 wherein said diode is a tunnel diode.

8. The combination comprising: a negative resistance diode having a current peak $I_p$, where $I<I_p<2I$; a first transistor connected in the common base configuration and having an emitter electrode connected to one terminal of said diode, said first transistor also having a collector elector; a load resistor and a biasing source serially connected between said collector and said base of said first transistor; a second transistor having a base electrode connected to said one terminal, an emitter electrode connected to the other terminal of said diode, and a collector electrode; means including a load resistor biasing said collector electrode of said second transistor so that said second transistor saturates when the collector current thereof has a value of approximately 2I; current input means connected to said other terminal; and first and second output terminals connected to the collector electrodes of said first transistor and said second transistor, respectively.

9. The combination claimed in claim 8 wherein said diode is a tunnel diode.

10. The combination claimed in claim 8 wherein said current input means supplies current in integral units of I to said other terminal.

11. The combination comprising: a first junction point and a second junction point; N negative resistance diodes connected in series in the same sense between said first junction point and said second junction point, the first of said diodes being connected to said first junction point and the Nth one of said diodes being connected to said second junction point, each of said diodes having a different peak current, the peak current of the $k$th diode having a value greater than $(2^k-1)I$ and less than $2^kI$, where $k$ is any integer defined as $1 \leqq k \leqq N$; N transistors each having an emitter-base path connected in parallel with a different one of said diodes and having a collector electrode; means biasing each said collector electrode so that the transistor connected in parallel with the $k$th one of said diode saturates when the collector current thereof has a value of approximately $2^kI$; and means for supplying input current as said second junction point.

12. The combination comprising: a first junction point and a second junction point; N negative resistance diodes connected in series between said first junction point and said second junction point, the first of said diodes being connected to said first junction point and the Nth one of said diodes being connected to said second junction point, each of said diodes having a different peak current, the peak current of the $k$th diode having a value greater than $(2^k-1)I$ and less than $2^kI$, where $k$ is any integer defined as $1 \leqq k \leqq N$; N transistors each having an emitter-base path connected in parallel with a different one of said diodes and having a collector electrode; circuit means biasing each said collector electrode so that the transistor connected in parallel with the $k$th one of said diodes saturates when the collector current of that transistor has a value of approximately $2^kI$; another transistor having an emitter-base diode connected between said first junction point and a point of reference potential; and means for supplying input current to said second junction point.

13. The combination comprising: a first junction point and a second junction point; N negative resistance diodes connected in series between said first junction point and said second junction point, the first of said diodes being connected to said first junction point and the Nth one of of said diodes being connected to said second junction point, each of said diodes having a different peak current, the peak current of the $k$th diode having a value greater than $(2^k-1)I$ and less than $2^kI$, where $k$ is any integer defined as $1 \leqq k \leqq N$; N transistors each having an emitter-base path connected in parallel with a different one of said diodes and having a collector electrode; means biasing each said collector electrode so that the transistor connected in parallel with the $k$th one of said diodes saturates when the collector current of that transistor has a value of approximately $2^kI$; means connected between said first terminal and a point of reference potential; and means for supplying input current in integral units of I to said second junction point.

14. The combiantion comprising: a first junction point and a second junction point; N negative resistance diodes connected in series between said first junction point and said second junction point, the first of said diodes being connected to said first junction point and the Nth one of said diodes being connected to said second junction point, each of said diodes having a different peak current, the peak current of the $k$th diode having a value greater than $(2^k-1)I$ and less than $2^kI$, where $k$ is any integer defined as $1 \leqq k \leqq N$; N transistors each having an emitter-base path connected in parallel with a different one of said diodes and having a collector electrode; means biasing each said collector electrode so that the transistor connector in parallel with the $k$th one of said diodes saturates when the collector current thereof has a value of approximately, $2^kI$; a transistor connected in the common base configuration and having an emitter electrode connected to said first junction point; and means for supplying input current to said second junction point.

15. The combination comprising: a first junction point and a second junction point; N negative resistance diodes connected in series between said first junction point and said second junction point, the first of said diodes being connected to said first junction point and the $n$th one of said diodes being connected to said second junction point, each of said diodes having a different peak current, the peak current of the $k$th diode having a value greater than $(2^k-1)I$ and less than $2^kI$, where $k$ is any integer defined as $1 \leqq k \leqq N$; N transistors each having an emitter-base path connected in parallel with a different one of said diodes and having a collector electrode; means biasing each said collector electrode so that the transistor connected in parallel with the $k$th one of said diodes saturates when the collector current thereof has a value of approximately $2^kI$; a transistor connected in the common base configuration and having an emitter electrode connected to said first junction point; and input means connected to said second junction point for supplying input current thereto in units of I.

16. The combination as claimed in claim 15 including a plurality of output terminals each connected to a different said collector electrode.

17. A full adder circuit having at least three input terminals for receiving input signals to be added and first and second output terminals, a first junction point connected to said input terminals, a second junction point connected to the second of said output terminals, a negative resistance diode connected between the junction points, and a transistor having emitter and base electrodes connected to different ones of the junction points and a collector electrode connected to the first of said output terminals, said diode and said transistor being biased so that an output is produced at the first output terminal when said input signals are applied to two or more of said input terminals, and an output is produced at the second output terminal when an odd number of inputs is applied to said input terminals.

18. A full adder circuit having input terminals for receiving input signals to be added and first and second output terminals, a first junction point connected to said input terminals, a second junction point connected to the second of said output terminals, a negative resistance diode connected between said junction points and having a threshold greater than any one of said input signals and less than any two of said input signals, and a transistor having base and emitter electrodes connected to different ones of said junction points and a collector electrode connected to the first of said output terminals, said transistor and said diode being biased so that an output is produced at the first output terminal when input signals are applied at two or more of said input terminals and an output is produced at the second output terminal when an odd number of inputs is applied to said input terminals.

19. A full adder circuit comprising: input terminals for receiving input signals to be added: a "sum" output terminal and a "carry" output terminal; a first junction point connected to said input terminals; a second junction point connected to said "sum" output terminal; a negative resistance diode connected between said junction points and having a switching threshold greater than any individual one of said input signals and less than any two of said input signals: a transistor having emitter and base electrodes connected to different ones of said junction points and a collector electrode connected to said "carry" output terminal; a collector supply resistor connected to said collector electrode; and means for limiting the total current which can flow from said collector electrode to said "carry" output terminal and to said collector supply resistor when two or more input signals are applied to said input terminals.

20. A full adder circuit comprising: a negative resistance diode having first and second electrodes and having a current peak $I_p$, where $I<I_p<2I$; a transistor having an emitter and a base connected to said first and second diode electrodes, respectively, and also having a collector; a collector supply resistor connected at one end to said collector; first, second and third input means each connected to the first of said diode electrodes for selectively supplying input current signals of amplitude I representing digits to be added; a "carry" output terminal connected to said collector; a "sum" output terminal; means connecting said "sum" output terminal to said base and to the second of said diode electrodes; and means for limiting the total current flowing from said collector to said "carry" output terminal and to said collector supply resistor to a value of approximately 2I, whereby a current is supplied to said "sum" output terminal when input signals are supplied at all of said input means.

21. The combination comprising: a negative resistance diode having a current peak $I_p$, where $I<I_p<2I$; a first transistor having an emitter-base path connected in parallel with said diode, and having also a collector; means biasing said collector so that said first transistor saturates when the collector current has a value of approximately 2I; a second transistor having an emitter-base diode connected between a point of reference potential and a point common to the base of said first transistor and to one terminal of said diode; and means connected at the other terminal of said diode for applying input current.

22. The combination as claimed in claim 21 wherein said input current means supplies current in integral units of I.

23. The combination as claimed in claim 21 including output means connected to the collector electrodes of the first and second transistors.

References Cited in the file of this patent

Akmenkalns: IBM Technical Disclosure Bulletin, vol. 3, No. 8, January 1961 (pp. 38 and 39 relied on). Copy in Scientific Library and Division 51.

Sylvan et al.: Tunnel Diodes as Amplifiers and Switches, General Electric reprint from May 1960 issue of Electronic Equipment Engineering. Copy in Div. 51.